Patented May 21, 1935

2,001,738

UNITED STATES PATENT OFFICE 2,001,738

ANTHRATHIAZOLE-ANTHRAQUINONE CARBONYL IMIDES AND PROCESS OF PREPARING THEM

Ralph Norbert Lulek, Milwaukee, Wis., assignor to E. I. du Pont de Nemours & Company, Wilmington, Del., a corporation of Delaware No Drawing. Application September 27, 1933, Serial No. 691,247

15 Claims. (Cl. 260—44)

This invention relates to carbon compounds and to methods for their production. More particularly, it relates to vattable organic compounds, especially anthraquinone vat colors, intermediates and dyes. In particular, it contemplates the condensation products of 1: 9-anthrathiazole-carbonyl-halides with amino-anthraquinone carboxylic acids.

This invention had for an object the preparation of new chemical compounds. Other objects were the preparation of carbon compounds in a very desirable physical form and in a high state of purity. Still further objects were to produce new vattable compounds, new vat colors, new vat dyes, new anthraquinone vat colors, new anthraquinone vat dyes, new vattable anthraquinone intermediates, new anthraquinone derivatives, new dye intermediates, new processes for preparing anthraquinone derivatives, new 1,9-anthrathiazole-carboxylic acid derivatives, new anthraquinone dye intermediates containing carboxyl groups, new anthraquinone dye intermediates containing carbonyl halide radicals, new and valuable amino-anthraquinone-carboxylic acid derivatives, and new condensation products of 1,9-anthrathiazole-2-carbonyl halides with amino-anthraquinone carboxylic acids. A general advance in the art and other objects which will appear hereinafter are also contemplated.

The foregoing objects and related ends are accomplished in the manner set out in the following description in which details of what is believed to be the best mode for carrying out the invention are disclosed. The aforementioned objects are accomplished by the present invention according to which 1,9-anthrathiazole-carbonyl halides are condensed with amino-anthraquinone carboxylic acids.

The invention will be further understood by a consideration of the following detailed description and illustrative specific examples in which the quantities are given in parts by weight.

Example I

Ten (10) parts of 1-amino-anthraquinone-6-carboxylic acid (Eckert—Monatashefte für Chemie 35, 289—1914) were heated and stirred with 11.8 parts of 1,9-anthrathiazole-2-carbonyl chloride in 300 parts of nitrobenzene to 150° C. for one hour. The new condensation product separated out in yellow needles and was filtered off after cooling from the charge. The reaction taking place is probably represented by the following equation:

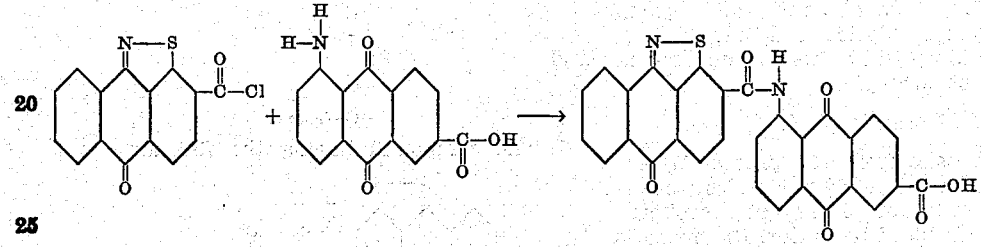

The new condensation product 1,9-anthrathiazole-2,1'-anthraquinonyl-carbonylimide-6'-carboxylic acid (otherwise called 1,9-anthrathiazoyl-1'-amino-anthraquinone-6'-carboxylic acid), after drying was a yellow crystalline powder soluble in concentrated sulfuric acid with an orange to yellow color. It produces a blue colored alkaline hydrosulfite vat. The reduced product upon oxidation changes color on cotton fiber from blue to green to brown to yellow.

The invention is not limited to the use of the particular amino anthraquinone carboxylic acid utilized in the above example. The carbonyl halides of other amino anthraquinone carboxylic acids may be used. As examples of such carboxylic acids, there may be mentioned: 1-amino-anthraquinone-2-carboxylic acid, 1-amino-anthraquinone-4-carboxylic acid, 1-amino-anthraquinone-7-carboxylic acid, 6-amino-anthraquinone-1-carboxylic acid, 1-amino-anthraquinone-8-carboxylic acid and 5-amino-anthraquinone-1-carboxylic acid.

Anthraquinone carboxylic acid containing a plurality of amine groups and amino anthraquinones containing a plurality of carboxylic radicals are also useful. Many amino-anthraquinone carboxylic acids, not herein mentioned, are useful as will be clear to those skilled in the art. Mention of such compounds are to be found in the literature, for example Beilstein-Prager-Jacobson Handbuch der Organischen Chemie 1929.

The condensation takes place so slowly at ordinary temperatures that for commercial manufacture it is very desirable to heat the reaction mass while the reaction is going on. Ordinarily, temperatures below 120° C. are not used. The upper temperature limit for the reaction depends upon the desires of the person carrying out the reaction and the equipment available. With appropriate equipment the reaction can be carried out at much higher temperatures than those given in Example I. However, as will be obvious, temperatures high enough to cause decomposition of the final product would not be used. One of the most desirable temperature ranges which applicant has found up to the present time is 145°–160° C.

The carbonyl chloride group may occupy a position other than the 2-position of the 1,9-anthrathiazole nucleus for example, 1,9-anthrathiazole-4-carbonyl chloride may be used to produce valuable compounds.

Any excess of the 1,9-anthrathiazole-2-carboxylic acid or the amino-anthraquinone-carboxylic acid can be separated from the condensation product by filtration at elevated temperatures for example, 100°–110° C. If the excess is greater than 15% the separation is not as satisfactory as when it is less than that amount.

The products prepared according to Example I may be readily converted to the corresponding carbonyl halides by treatment of the condensation product with a material capable of changing the carboxyl group to a carbonyl-halide group for example thionyl chloride and thionyl bromide. This procedure will be readily understood from the following example.

*Example II*

The wet filter cake from the process of Example I was suspended in 100 parts of nitrobenzene and to the resultant 16 parts of phosphorus penta-chloride added. Thereafter, the mass is heated to 100° C. and held for one hour. After cooling the resulting acid chloride was filtered, washed with nitrobenzene, alcohol and dried. It is a yellow powder crystalline and soluble in concentrated sulfuric acid and pyridine with a yellow color.

In carrying out the various reactions of applicant's new processes, other solvents or suspension agents than nitrobenzene may be used. Such media as chlorbenzenes for example, ortho-dichlorbenzene, tri-chlorbenzene, tri-chloro-ethylene and tetra-chloro-ethylene may be used satisfactorily. In general, the solvent used should boil higher than 150° C.

The new 1,9-anthrathiazole-anthraquinonyl-carbonylimide-carboxylic acids and corresponding carbonyl halides are valuable vat colors and vat dye intermediates.

As many apparently widely different embodiments may be made of this invention without departing from the spirit and scope thereof, it is to be understood that I do not limit myself to the specific embodiments thereof except as defined in the appended claims.

I claim:

1. The new compound 1,9-anthrathiazole-2,1'-anthraquinonyl - carbonylimide - 6'-carboxylic acid.

2. The process of producing 1,9-anthrathiazole-2,1'-anthraquinonyl-carbonylimide-6'-carboxylic acid comprising condensing 1-amino-anthraquinone-6-carboxylic-acid with 1,9-anthrathiazole-2-carboxylic-acid-chloride in the presence of nitrobenzene while heated to approximately 150° C.

3. The process of producing 1,9-anthrathiazole-2,1'-anthraquinonyl-carbonylimide-6'-carboxylic acid comprising condensing 1-amino-anthraquinone-6-carboxylic-acid with 1,9-anthrathiazole-2-carboxylic-acid-chloride while heated to approximately 150° C.

4. The process of producing 1,9-anthrathiazole-2,1'-anthraquinonyl-carbonylimide-6'-carboxylic acid comprising condensing 1-amino-anthraquinone-6-carboxylic-acid with 1,9-anthrathiazole-2-carboxylic-acid-chloride in the presence of nitrobenzene.

5. The process of producing 1,9-anthrathiazole-2,1'-anthraquinonyl-carbonylimide-6'-carboxylic acid comprising condensing 1-amino-anthraquinone-6-carboxylic-acid with 1,9-anthrathiazole-2-carboxylic-acid-chloride.

6. The compound having the formula

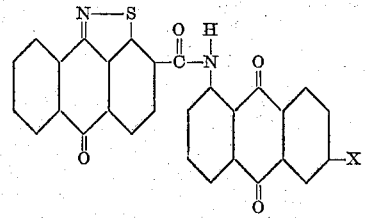

where X is a member of the group

and

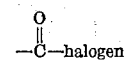

7. The compound having the formula

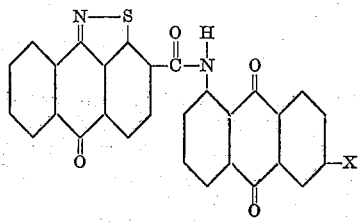

where X is a member of the group

and

8. The compound obtainable by treating ten (10) parts of 1-amino-anthraquinone-6-carboxylic acid with eleven and eight-tenths (11.8) parts of 1,9-anthrathiazole-2-carboxylic-acid-chloride in the presence of three hundred (300) parts of nitrobenzene while heated to approximately 150° C., filtering off the reaction product, suspending it in one hundred (100) parts of nitrobenzene and adding sufficient phosphorus pentahalide to convert the suspended carboxylic acid to the corresponding carbonyl halide and heating at 100° C. until the conversion is complete, which probably has the formula

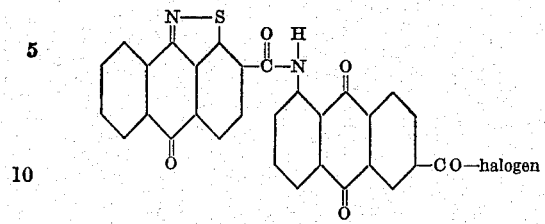

which is a yellow crystalline powder which is soluble in sulfuric acid with a yellow color and which is soluble in pyridine with a yellow color.

9. The compound obtainable by treating ten (10) parts of 1-amino-anthraquinone-6-carboxylic acid with eleven and eight-tenths (11.8) parts of 1,9-anthrathiazole-2-carboxylic-acid-chloride in the presence of three hundred (300) parts of nitrobenzene while heated to approximately 150° C., filtering off the reaction product, suspending it in one hundred (100) parts of nitrobenzene and adding sixteen (16) parts of phosphorus pentachloride heating at 100° C., which probably has the formula

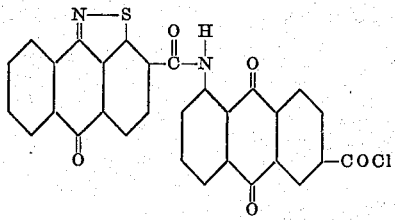

which is a yellow crystalline powder which is soluble in sulfuric acid with a yellow color and which is soluble in pyridine with a yellow color.

10. The compound obtainable by treating ten (10) parts of 1-amino-anthraquinone-6-carboxylic acid with eleven and eight-tenths (11.8) parts of 1,9-anthrathiazole-2-carboxylic-acid-chloride in the presence of three hundred (300) parts of nitrobenzene while heated to approximately 150° C., and which probably has the formula

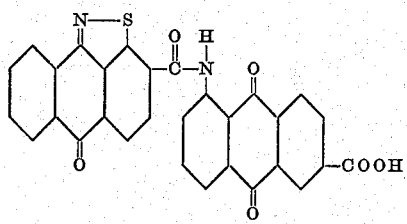

11. The compound having the formula

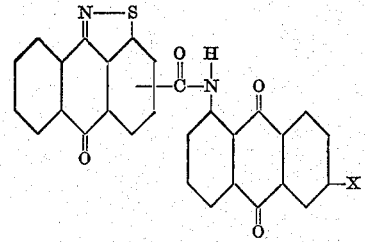

where X is a member of the group

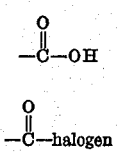

and

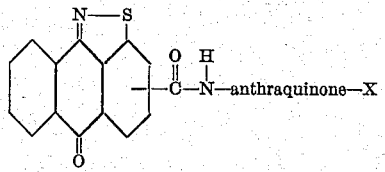

12. The compound having the formula

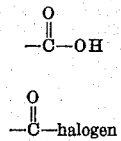

where X is a member of the group

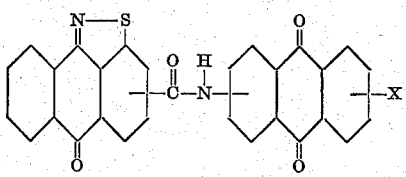

and

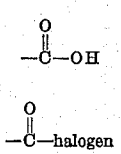

13. The compound having the formula

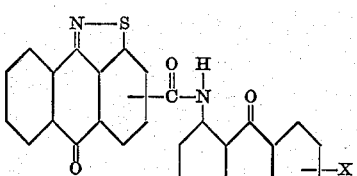

where X is a member of the group

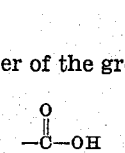

and

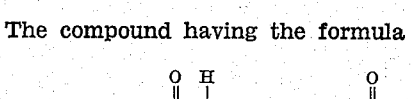

14. The compound having the formula $$\text{N—S}$$

where X is a member of the group $$-\overset{O}{\underset{\|}{C}}-OH$$

and $$-\overset{O}{\underset{\|}{C}}-\text{halogen}$$

15. The compound having the formula $$1,9\text{-anthrathiazole}-\overset{O}{\underset{\|}{C}}-\overset{H}{\underset{|}{N}}-\text{anthraquinone}-\overset{O}{\underset{\|}{C}}-Cl$$

RALPH N. LULEK.